(12) United States Patent
Ishikawa (10) Patent No.: US 10,781,881 B2
(45) Date of Patent: Sep. 22, 2020

(54) FLUID-FILLED VIBRATION-DAMPING DEVICE

(71) Applicant: SUMITOMO RIKO COMPANY LIMITED, Komaki-shi, Aichi (JP)

(72) Inventor: Ryota Ishikawa, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 8 days.

(21) Appl. No.: 16/221,999

(22) Filed: Dec. 17, 2018

(65) Prior Publication Data

US 2019/0285133 A1 Sep. 19, 2019

(30) Foreign Application Priority Data

Mar. 14, 2018 (JP) .................. 2018-046360

(51) Int. Cl.
*F16F 13/10* (2006.01)

(52) U.S. Cl.
CPC .................. *F16F 13/106* (2013.01)

(58) Field of Classification Search
CPC ....... F16F 13/105; F16F 13/106; F16F 13/107
USPC .......... 267/140.13, 140.14, 140.15
See application file for complete search history.

(56) References Cited

U.S. PATENT DOCUMENTS

| | | | | |
|---|---|---|---|---|
| 7,419,144 B2* | 9/2008 | Hasegawa | ............. | F16F 13/106 267/140.13 |
| 8,783,668 B2 | 7/2014 | Ishikawa et al. | | |
| 9,488,246 B2* | 11/2016 | Satori | ................... | B60K 5/1208 |
| 2011/0101581 A1* | 5/2011 | Kubo | ..................... | F16F 13/106 267/140.13 |
| 2015/0316121 A1* | 11/2015 | Kadowaki | ............ | B60K 5/1208 267/140.13 |

FOREIGN PATENT DOCUMENTS

| | | | |
|---|---|---|---|
| JP | 2008002618 A | * | 1/2008 |
| JP | 2013194848 A | * | 9/2013 |

OTHER PUBLICATIONS

Jun. 3, 2020 Office Action issued in Chinese Patent Application No. 201910111344.2.

* cited by examiner

*Primary Examiner* — Thomas J Williams
(74) *Attorney, Agent, or Firm* — Oliff PLC (57) ABSTRACT

A fluid-filled vibration-damping device including: two elastically-connected attachment members; two liquid chambers divided by a partitioner having a storing space; an elastic mover disposed in the storing space and having a support supported by the partitioner; a positioner provided on at least one of radial inside and outside of the support, partially in a peripheral direction of the support, in abutment against a peripheral wall face of the storing space; a valve separate from the positioner in the peripheral direction, and the peripheral wall face in opposition; an axially-thin part connecting the positioner and the valve to the support in a displaceable manner; a communication passage connecting the liquid chambers formed between the peripheral wall face and the valve; and a switch configured to obstruct the communication passage by abutment of the valve against the peripheral wall face.

6 Claims, 8 Drawing Sheets

FLUID-FILLED VIBRATION-DAMPING DEVICE

INCORPORATED BY REFERENCE

The disclosure of Japanese Patent Application No. 2018-046360 filed on Mar. 14, 2018 including the specification, drawings and abstract is incorporated herein by reference in its entirety.

BACKGROUND OF THE INVENTION

1. Field of the Invention

The present invention relates to a fluid-filled vibration-damping device used for an automotive engine mount, etc.

2. Description of the Related Art

There has been known a vibration-damping device interposed between components of a vibration transmission system such as a power unit and a vehicle body to link the components to each other in a vibration-damping manner. The vibration-damping device is applied to an engine mount, or the like. Besides, as a kind of vibration-damping device, there is also proposed a fluid-filled vibration-damping device using vibration-damping effect based on flowing action of non-compressible fluid filled therein. This fluid-filled vibration-damping device has a structure wherein a first attachment member and a second attachment member are elastically connected by a main rubber elastic body, while a pressure-receiving chamber and an equilibrium chamber with non-compressible fluid filled therein are formed on both sides of the partitioner supported by the second attachment member, for example as described in U.S. Pat. No. 8,783,668.

In the fluid-filled vibration-damping device described in U.S. Pat. No. 8,783,668, a second orifice passage that connects the pressure-receiving chamber and the equilibrium chamber with one another can be switched by a switch between a communication state and a blocked state. Specifically, a switch of an elastic mover disposed at the partitioner is switched between a separation state from the inner face of the second orifice passage and a contact state with the inner face of the second orifice passage depending on the amplitude of an input vibration, whereby the second orifice passage can be switched between the communication state and the blocked state depending on the amplitude of the input vibration.

However, in U.S. Pat. No. 8,783,668, a gap between the switch and the inner face of the second orifice passage that face each other along the entire circumference varies due to a dimensional error of the elastic mover or the partitioner, and the like, so that a gap large enough to allow the dimensional error is required. As a result, it is possible as well that the gap cannot be formed stably due to the dimensional error of the elastic mover or the partitioner, and the like, in a case that requires setting a smaller gap, e.g., a case where the state needs to be switched between communication and block of the second orifice passage by a smaller amplitude range.

SUMMARY OF THE INVENTION

It is therefore one object of this invention to provide a fluid-filled vibration-damping device of novel structure capable of stably switching between a communication state and a blocked state of a communication passage by a valve, even by a smaller amplitude range.

The above and/or optional objects of this invention may be attained according to at least one of the following preferred embodiments of the invention. The following preferred embodiments and/or elements employed in each preferred embodiment of the invention may be adopted at any possible optional combinations.

Specifically, a first preferred embodiment of the present invention provides a fluid-filled vibration-damping device comprising: a first attachment member; a second attachment member; a main rubber elastic body elastically connecting the first attachment member and the second attachment member with each other; a primary liquid chamber filled with a non-compressible fluid; an auxiliary liquid chamber filled with the non-compressible fluid; a partitioner dividing the primary liquid chamber and the auxiliary liquid chamber formed at opposite sides of the partitioner, the partitioner having a storing space; an elastic mover disposed in the storing space and having a support, the support being supported by the partitioner; a positioner provided on at least one of a radial inside and a radial outside of the support, the positioner being provided partially in a peripheral direction of the support, and being disposed such that the positioner is abutted against a peripheral wall face of the storing space; a valve provided at a portion separate from the positioner in the peripheral direction, the valve being disposed opposite to the peripheral wall face of the storing space and separated from the peripheral wall face; a thin part having a thin wall in an axial direction, the thin part connecting the positioner and the valve relative to the support in a displaceable manner; a communication passage formed between the peripheral wall face of the storing space and the valve, the communication passage connecting the primary liquid chamber and the auxiliary liquid chamber with each other; and a switch configured to block up the communication passage by an abutment of the valve against the peripheral wall face of the storing space.

With the fluid-filled vibration-damping device of construction according to the above first preferred embodiment, the positioner is disposed in a contact state with the peripheral wall face of the storing space in the partitioner, whereby the valve provided separately from the positioner in the peripheral direction is positioned by the positioner relative to the peripheral wall face of the storing space. Therefore, even if the distance in the opposition direction between the valve and the peripheral wall face of the storing space is made small, it is possible to stably form the communication passage. Additionally, also when displacement or deformation of the valve is smaller, the valve is abutted against the peripheral wall face to block up the communication passage, so that it is possible to switch the communication state and the blocked state of the communication passage in relation to an input of vibration in a smaller amplitude range.

Moreover, the position of the support relative to the positioner and the valve in the elastic mover can be changed by deformation of the thin part. Thus, even if a dimensional error, etc. is included in the elastic mover or the partitioner, the positioner and the valve are stably positioned in prescribed locations in the storing space, by the deformation of the thin part.

A second preferred embodiment of the present invention provides the fluid-filled vibration-damping device according to the first preferred embodiment, further comprising at least one concave groove opening in the peripheral wall face of the storing space while being formed partially in the peripheral direction, wherein the communication passage is formed at a formation portion of the concave groove in the peripheral direction.

According to the second preferred embodiment, the valve is disposed in the formation portion of the concave groove opening in the peripheral wall face of the storing space, while the positioner is disposed in a portion separate from the concave groove in the peripheral direction. By so doing, it becomes easier to realize both the abutment state of the positioner against the peripheral wall face and the opposition state of the valve to the peripheral wall face with a distance in between.

A third preferred embodiment of the present invention provides the fluid-filled vibration-damping device according to the second preferred embodiment, wherein the at least one concave groove comprises two concave grooves formed at opposite axial ends in the peripheral wall face of the storing space so that a convex portion is provided between the concave grooves formed at the opposite axial ends, a concave portion is formed in the valve of the elastic mover, in a face of the valve opposite to the peripheral wall face, and the convex portion of the peripheral wall face is disposed opposite to the concave portion of the valve with a distance in between so that the communication passage extends between the convex portion and the concave portion.

According to the third preferred embodiment, the abutment between the convex portion of the peripheral wall face of the storing space and the inner face of the concave portion of the valve also enables blocking of the communication passage.

A fourth preferred embodiment of the present invention provides the fluid-filled vibration-damping device according to the third preferred embodiment, wherein the convex portion of the peripheral wall face is inserted in the concave portion of the valve.

With the fourth preferred embodiment, the valve is displaced in the axial direction by the liquid pressure upon a vibration input, whereby the convex portion of the peripheral wall face and the inner face of the concave portion of the valve get into contact. Thus, also by the axial displacement of the valve, the communication passage is blocked up. Consequently, compared with a case that the communication passage is blocked up by deformation or tilting by displacement of the valve, it is stably switched between the communication state and the blocked state of the communication passage, also when the amplitude of the input vibration is small.

A fifth preferred embodiment of the present invention provides the fluid-filled vibration-damping device according to the third or fourth preferred embodiment, wherein each axial side face of the convex portion is a slanting face such that the convex portion has a tapered shape whose width gets narrower in the axial direction as it goes toward a protruding tip thereof.

According to the fifth preferred embodiment, the valve does not only undergo axial displacement but also tilts. When the valve is abutted against the axial side face of the convex portion of the peripheral wall face to block up the communication passage, since the side face of the convex portion is a slanting face, the contact face between the valve and the side face of the convex portion is set more widely. Therefore, even if the relative positioning of the valve and the convex portion changes by displacement or deformation mode, the valve and the side face of the convex portion are stably abutted against each other, so that the communication passage is blocked up stably.

A sixth preferred embodiment of the present invention provides the fluid-filled vibration-damping device according to any one of the second to fifth preferred embodiments, wherein the positioner and the valve in the elastic mover have the same shape mutually.

With the sixth preferred embodiment, it is not necessary to position the elastic mover in the peripheral direction relative to the partitioner corresponding to the disposition of the positioner and the valve. This can facilitate attachment work of the elastic mover to the partitioner. If the positioner and the valve have the same shape mutually, the valve separate from the peripheral wall face is constituted in the formation portion of the concave groove, while the positioner in contact with the peripheral wall face is constituted in the portion separate from the concave groove in the peripheral direction.

A seventh preferred embodiment of the present invention provides the fluid-filled vibration-damping device according to any one of the first to sixth preferred embodiments, wherein an outside dimension in the axial direction of the valve gets larger as it goes toward the peripheral wall face of the storing space.

According to the seventh preferred embodiment, when the valve is abutted against the peripheral wall face of the storing space by elastic deformation or tilting, an axial side thereof is abutted against the peripheral wall face. Each axial side of the valve has a thin wall in the contact direction in relation to the peripheral wall face with its spring lowered, thus reducing striking noise, impact, and the like due to the contact between the valve and the peripheral wall face.

With the present invention, the positioner of the elastic mover is disposed in a contact state with the peripheral wall face of the storing space in the partitioner. By so doing, the valve provided separately from the positioner in the peripheral direction is positioned by the positioner relative to the peripheral wall face of the storing space. Even if the distance in the opposition direction between the valve and the peripheral wall face of the storing space is made small, the communication passage connecting the primary liquid chamber and the auxiliary liquid chamber is stably formed between the valve and the peripheral wall face. Besides, the communication passage is precisely switched between the communication state and the blocked state by the valve, in relation to a vibration input in a smaller amplitude range.

BRIEF DESCRIPTION OF THE DRAWINGS

The foregoing and/or other objects, features and advantages of the invention will become more apparent from the following description of a practical embodiment with reference to the accompanying drawings in which like reference numerals designate like elements and wherein:

FIG. 12A and FIG. 12B are enlarged longitudinal cross sectional views of a principal part of the engine mount shown in FIG. 1, wherein FIG. 12A shows a communication state of a communication passage, while FIG. 12B shows a blocked state of the communication passage.

DETAILED DESCRIPTION OF EMBODIMENTS

A practical embodiment of the present invention will be described below in reference to the drawings.

Figure 1:
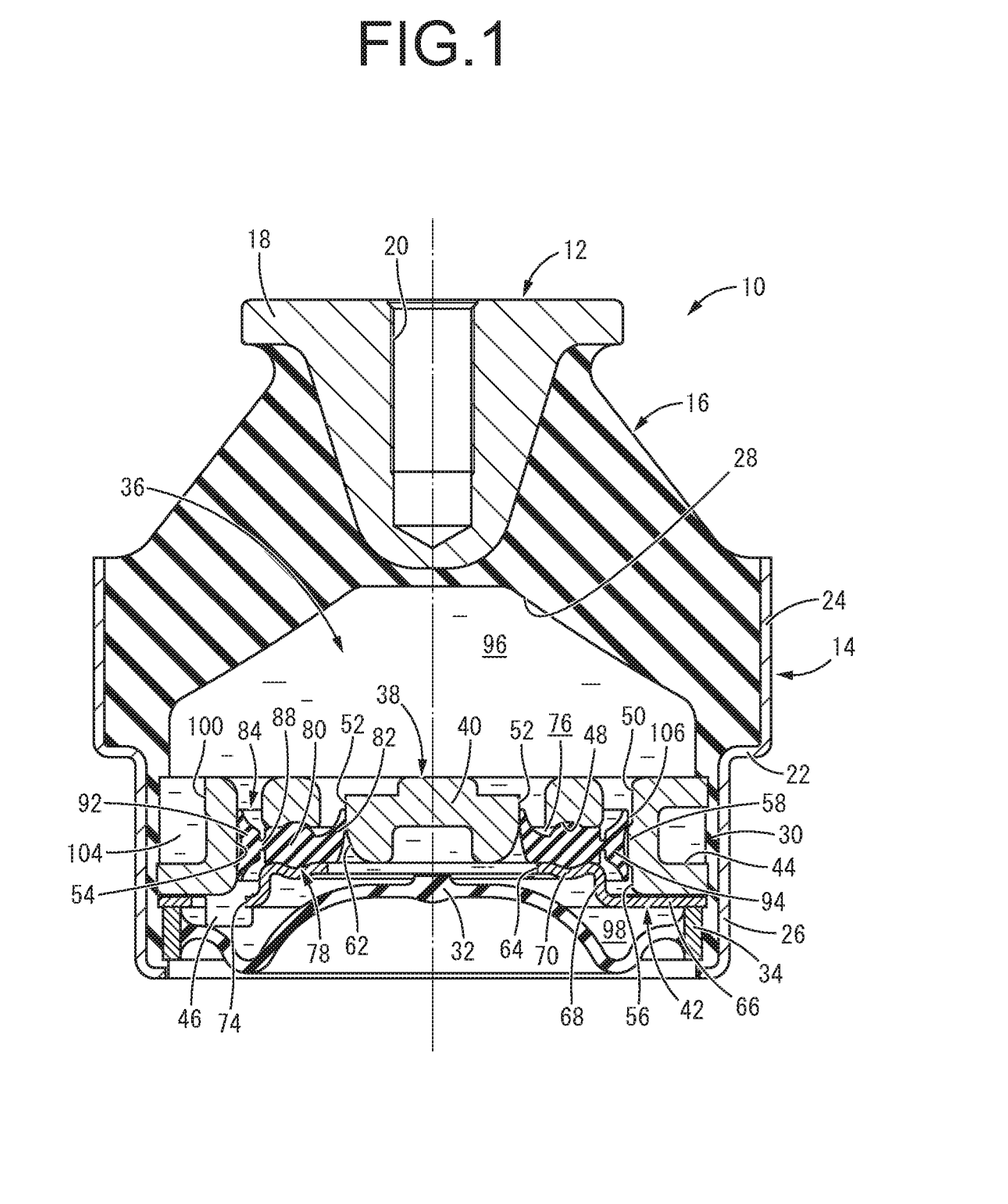
FIG. 1 is a longitudinal cross sectional view showing a fluid-filled vibration-damping device in the form of an engine mount as a first practical embodiment of the present invention.
Figure 2:
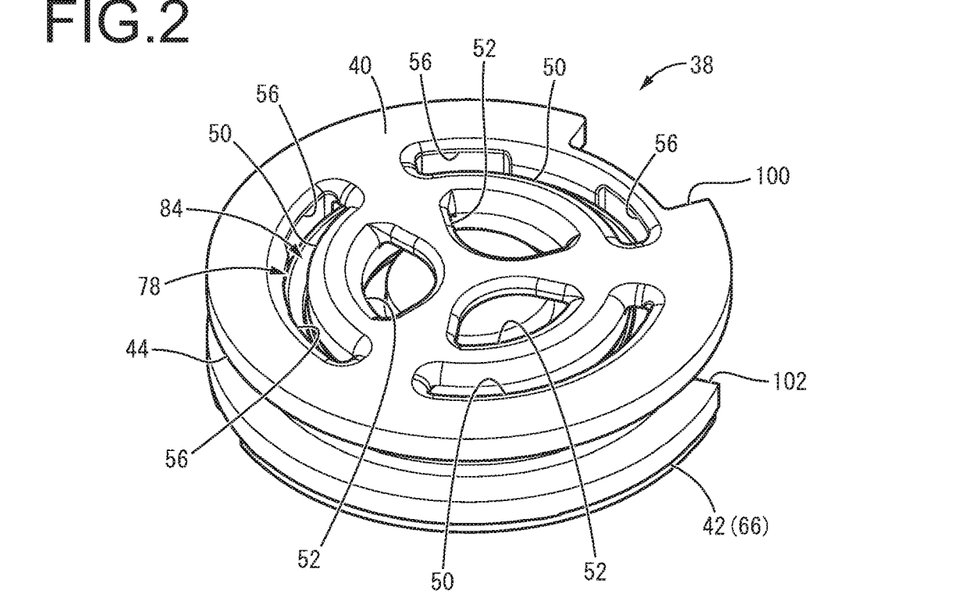
FIG. 2 is a perspective view of a partitioner constituting the engine mount shown in FIG. 1, with an elastic mover stored therein.
Figure 3:
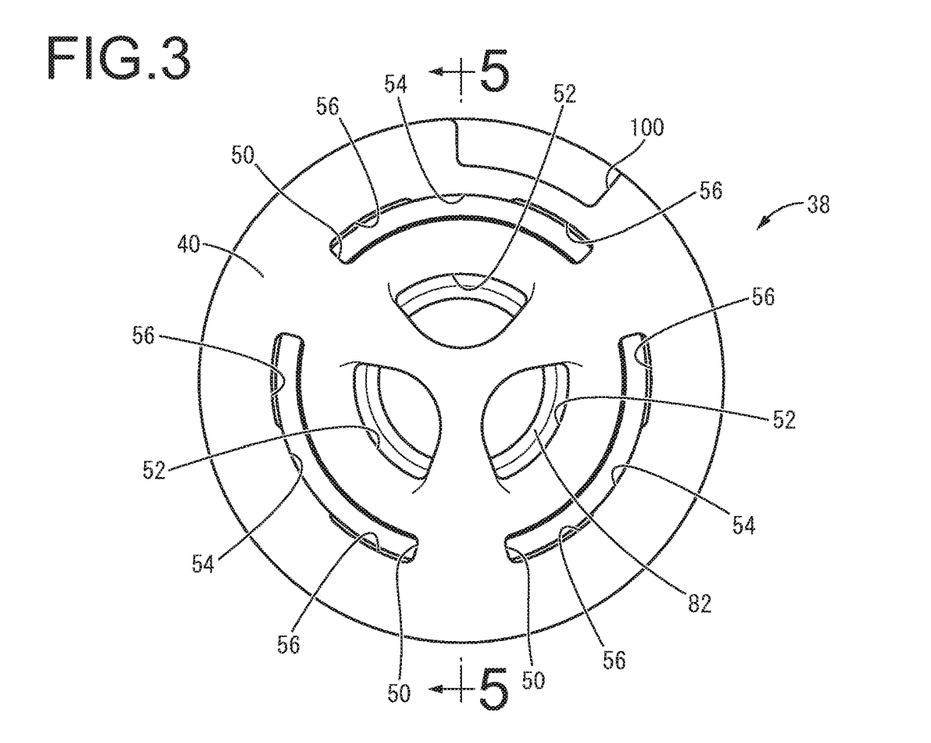
FIG. 3 is a plan view of the partitioner shown in FIG. 2.

FIG. 1 shows an automotive engine mount 10 serving as a first practical embodiment of a fluid-filled vibration-damping device with a structure according to the present invention. The engine mount 10 has a structure wherein a first attachment member 12 and a second attachment member 14 are elastically connected with each other by a main rubber elastic body 16. In description hereinafter, the up-down direction means the up-down direction in FIG. 1, which is the axial direction in which the mount center axis extends and the main vibration input direction, as a general rule.

More specifically, the first attachment member 12 is made of metal, etc. and has a shape of inverted roughly truncated cone whose diameter gets gradually smaller as it goes to the lower side. A flanged portion 18 is integrally formed at the upper end of the first attachment member 12 so as to protrude to the outer periphery. Additionally, a screw hole 20 is formed opening in the upper face so as to extend in the up-down direction on the center axis in the first attachment member 12.

The second attachment member 14 is made of metal, etc. like the first attachment member 12, and has a generally cylindrical shape with a thin wall and a large diameter. A step part 22 is provided at the axially middle portion of the second attachment member 14, so that the portion upper than the step part 22 is a large-diameter tubular part 24, while the portion lower than the step part 22 is a small-diameter tubular part 26.

The first attachment member 12 is disposed above the second attachment member 14, substantially coaxially, and the first attachment member 12 and the second attachment member 14 are elastically linked by the main rubber elastic body 16. The main rubber elastic body 16 has a shape of approximately truncated cone whose diameter gets gradually smaller as it goes to the upper side. For the main rubber elastic body 16, the upper end, which is the small-diameter side end, is bonded by vulcanization to the first attachment member 12, while the lower end, which is the large-diameter side end, is bonded by vulcanization to the second attachment member 14. The main rubber elastic body 16 of this practical embodiment takes the form of an integrally vulcanization molded component incorporating the first attachment member 12 and the second attachment member 14.

Moreover, a recess 28 is formed in the main rubber elastic body 16, opening to the lower face thereof in an inverted nearly bowl shape. Furthermore, a tubular seal rubber layer 30 is formed integrally with the main rubber elastic body 16 so as to project downward at the outer peripheral side of the recess 28. Consequently, the radially inner face of the small-diameter tubular part 26 of the second attachment member 14 is covered by the seal rubber layer 30.

A flexible film 32 is attached at the lower end of the second attachment member 14. The flexible film 32 is a thin rubber film that takes the form of a generally circular plate or a circular dome, which permits flexure deformation and extension/contraction deformation. In a state where an annular fixing member 34 fixed at the outer peripheral end of the flexible film 32 is inserted in the lower end of the second attachment member 14, the second attachment member 14 is subjected to a diameter reduction process. By so doing, the fixing member 34 is fixed to the lower end of the second attachment member 14 via the seal rubber layer 30, so that the flexible film 32 is attached to the lower end of the second attachment member 14.

Consequently, the upper opening of the second attachment member 14 is closed fluid-tightly by the main rubber elastic body 16, while the lower opening of the second attachment member 14 is closed fluid-tightly by the flexible film 32. A fluid filling section 36 is formed between the main rubber elastic body 16 and the flexible film 32 in the up-down direction. This fluid filling section 36 is defined fluid-tightly to the outside, and a non-compressible fluid is filled therein. The non-compressible fluid filled in the fluid filling section 36 is not particularly limited, but it is preferable to use a liquid, e.g., water, ethylene glycol, alkylene glycol, polyalkylene glycol, silicone oil, a mixture liquid of some of them, and the like. In addition, the non-compressible fluid is desired to be a liquid with low viscosity of 0.1 Pa·s or lower, in order to efficiently obtain vibration-damping effect on the basis of flowing action of the fluid described later.

A partitioner 38 is disposed in the fluid filling section 36. As FIGS. 2 to 5 show, the partitioner 38 has a thick, large-diameter, generally circular plate shape and a structure wherein a bottom plate member 42 is attached to a partitioner main unit 40.

Figure 6:
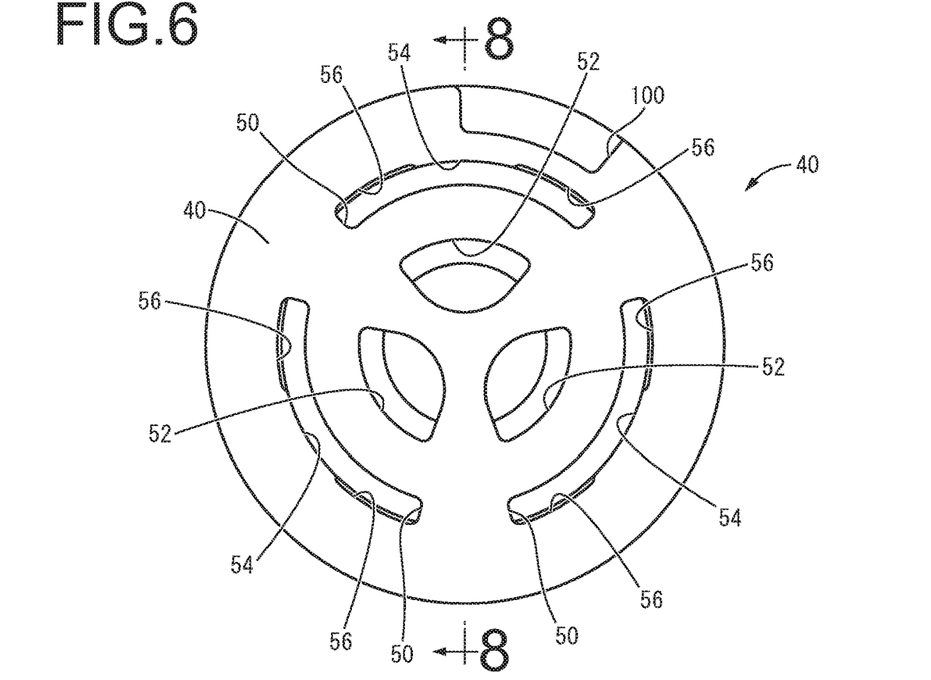
FIG. 6 is a plan view of a partitioner main unit constituting the partitioner shown in FIG. 2.
Figure 7:
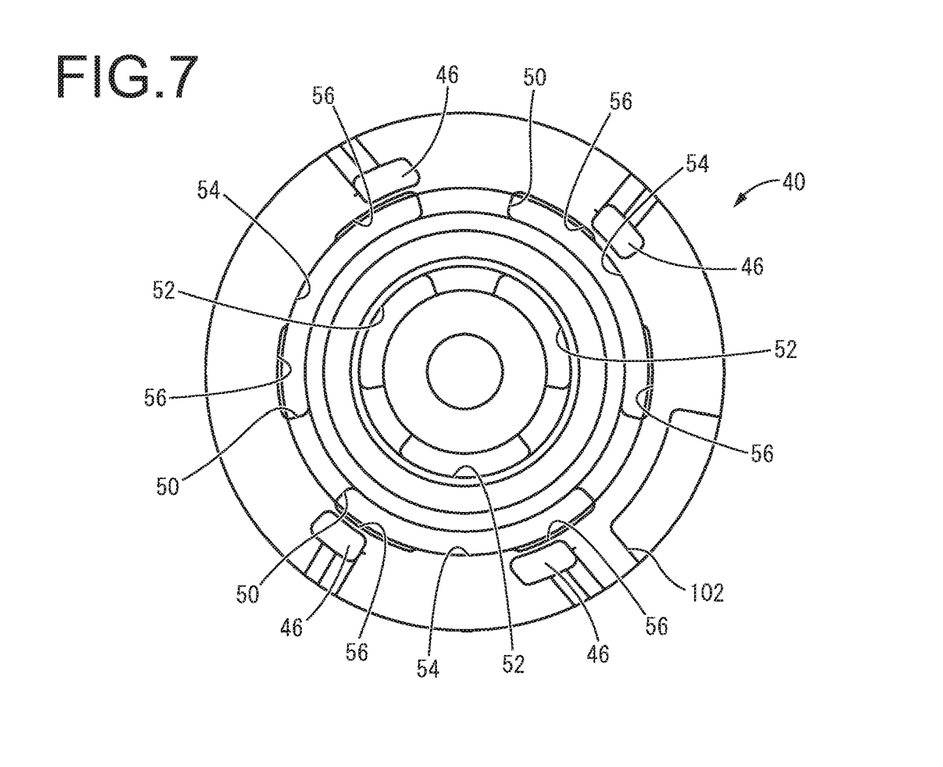
FIG. 7 is a bottom view of the partitioner main unit shown in FIG. 6.
Figure 8:
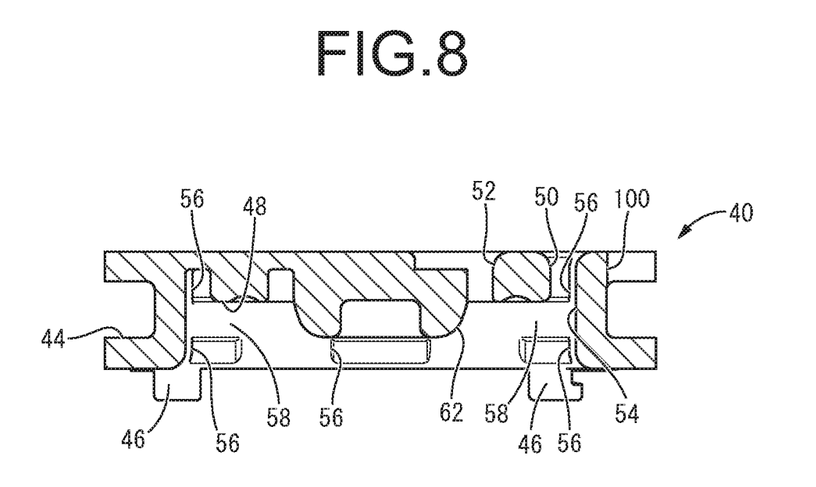
FIG. 8 is a cross sectional view taken along line 8-8 of FIG. 6.

The partitioner main unit 40 is made of metal, rigid synthetic resin, or the like, and has a thick approximately circular plate shape as a whole, shown in FIGS. 6 to 8. A circumferential groove 44 is formed at the outer peripheral end of the partitioner main unit 40, while opening in the outer peripheral face and extending in the circumferential direction. Additionally, a plurality of detaining connection parts 46 projecting downward are formed integrally with the outer peripheral part of the partitioner main unit 40.

An annular storing concavity 48 is formed at the radially intermediate portion of the partitioner main unit 40, while opening in the lower face thereof and extending in the circumferential direction. In this storing concavity 48, upper communication holes 50 are formed partially in the circumferential direction so as to pass through the outer peripheral end of the upper base wall in the up-down direction. On the other hand, upper relief holes 52 are formed partially in the circumferential direction so as to pass through the radially inner part of the upper base wall in the up-down direction. In this practical embodiment, three upper communication holes 50 and three upper relief holes 52 are formed and disposed at respective equal intervals in the circumferential direction.

Figure 9:
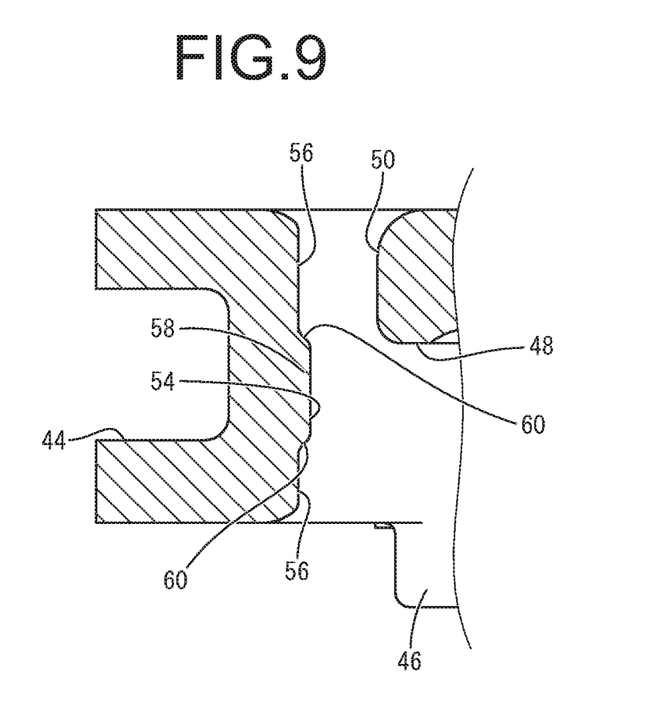
FIG. 9 is an enlarged longitudinal cross sectional view of a principal part of the partitioner main unit shown in FIG. 6.

Here, in an outer peripheral wall face 54 of the storing concavity 48, concave grooves 56 are formed at a plurality of locations in the circumferential direction. The concave grooves 56 are provided partially in the peripheral direction, as shown also in FIG. 9, so as to open to the radial inside and extend in the up-down direction. The concave grooves 56 are formed at both upper and lower ends of the outer peripheral wall face 54 of the storing concavity 48. Besides, the portion between the upper and lower concave grooves 56, 56 provided at the same circumferential position is made into a convex portion 58 that protrudes to the radial inside, by forming the concave grooves 56, 56. Thus, at the position in the up-down direction where the convex portion 58 is formed, the inside dimension of the outer peripheral wall face 54 is approximately constant along the entire circumference. On the other hand, at the up-down positions where the concave grooves 56 are formed, the inside dimension of the outer peripheral wall face 54 varies in the circumferential direction because of the concave grooves 56. In the convex portion 58 of this practical embodiment, both upper and lower side faces 60, 60 are slanting faces that slant to the axial inside as it goes to the radial inside. The convex portion 58 has a tapered shape whose width gets narrower in the up-down direction as it goes toward the projecting tip thereof, both upper and lower end edges in the projecting tip of the convex portion 58 have obtuse angles.

In the present practical embodiment, the concave grooves 56 are formed at a plurality of locations (six locations here) in the circumferential direction, while the concave grooves 56 at the plurality of circumferential positions are disposed at nearly equal intervals in the circumferential direction. Also, all of the concave grooves 56 at the plurality of circumferential positions are provided in the circumferential locations where the upper communication holes 50, 50, 50 in the partitioner main unit 40 are formed. Especially in this practical embodiment, the concave grooves 56 are disposed so that they are positioned at the opposite end portions in the circumferential direction of the corresponding upper communication holes 50, while none of the concave grooves 56 is disposed in the circumferential portions between the upper communication holes 50, 50, 50.

With respect to a radially inner wall face 62 of the storing concavity 48, the upper part has a substantially cylindrical shape, while the lower part is a tapered face whose diameter gets gradually smaller as it goes downward, and it has an approximately constant cross sectional shape along the entire circumference.

Figure 4:
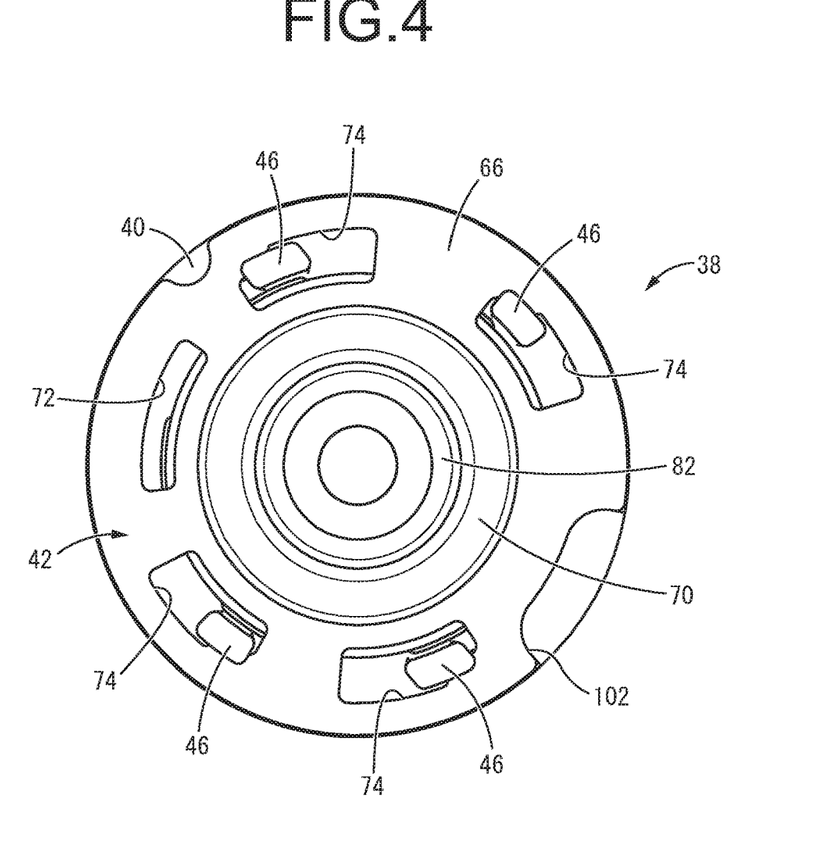
FIG. 4 is a bottom view of the partitioner shown in FIG. 2.
Figure 5:
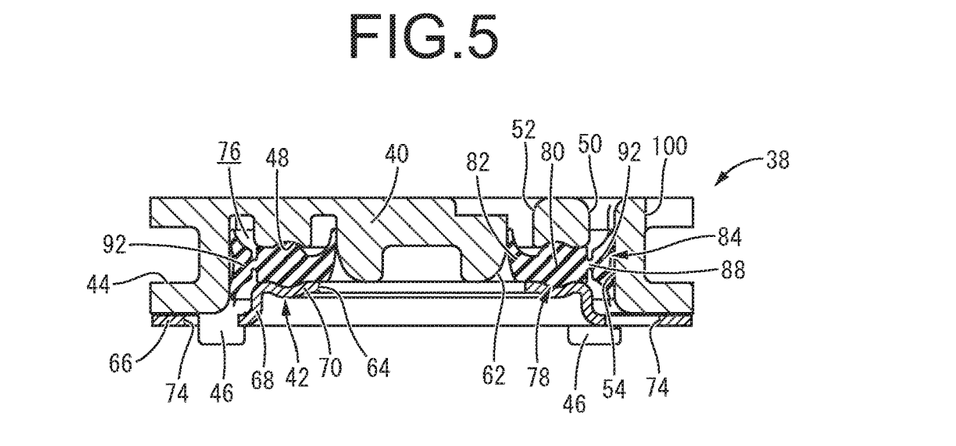
FIG. 5 is a cross sectional view taken along line 5-5 of FIG. 3.

The bottom plate member 42 is made of metal, etc., and has a thin nearly annular plate shape as a whole, with a central hole 64, as FIGS. 4 and 5 show. The bottom plate member 42 has a structure wherein a tubular step part 68 is provided projecting upward at the radially inner end of an outer peripheral attachment part 66 in a roughly annular plate shape. In the structure, a radially inner clamping part 70 in a shape of inner flange protruding to the radial inside from the upper end of the step part 68 is integrally formed at it. Besides, a lower communication hole 72 is formed in the outer peripheral attachment part 66 of the bottom plate member 42, passing through it in the up-down direction. Meanwhile, a plurality of connection holes 74 are formed at locations separate from the lower communication hole 72 so as to pass through the outer peripheral attachment part 66 in the up-down direction.

The bottom plate member 42 is superposed on the lower face of the partitioner main unit 40. In a state where the detaining connection parts 46 of the partitioner main unit 40 are inserted through the connection holes 74 of the bottom plate member 42, the partitioner main unit 40 and the bottom plate member 42 are displaced relatively in the circumferential direction. As a result, the detaining connection parts 46 are detained at the opening edges of the connection holes 74 in the bottom plate member 42 in the axial direction, thus connecting the partitioner main unit 40 and the bottom plate member 42 with each other.

By attaching the bottom plate member 42 to the partitioner main unit 40, the lower opening of the storing concavity 48 of the partitioner main unit 40 is covered by the radially inner clamping part 70 of the bottom plate member 42, whereby a ring-shaped storing space 76 is formed between the partitioner main unit 40 and the bottom plate member 42. The peripheral wall face of the storing space 76 in the present practical embodiment is the outer peripheral wall face of the storing space 76, and it is constituted by the outer peripheral wall face 54 of the storing concavity 48. Moreover, the radially inner wall face of the storing space 76 is constituted by the radially inner wall face 62 of the storing concavity 48. The radially inner end of the radially inner clamping part 70 of the bottom plate member 42 is located radially outside the radially inner wall face 62, and the radially inner end of the storing space 76 is opened to the lower side through the central hole 64 of the bottom plate member 42, thus constituting a lower relief hole constituting a short-circuit passage 110, which will be described later.

Figure 10:
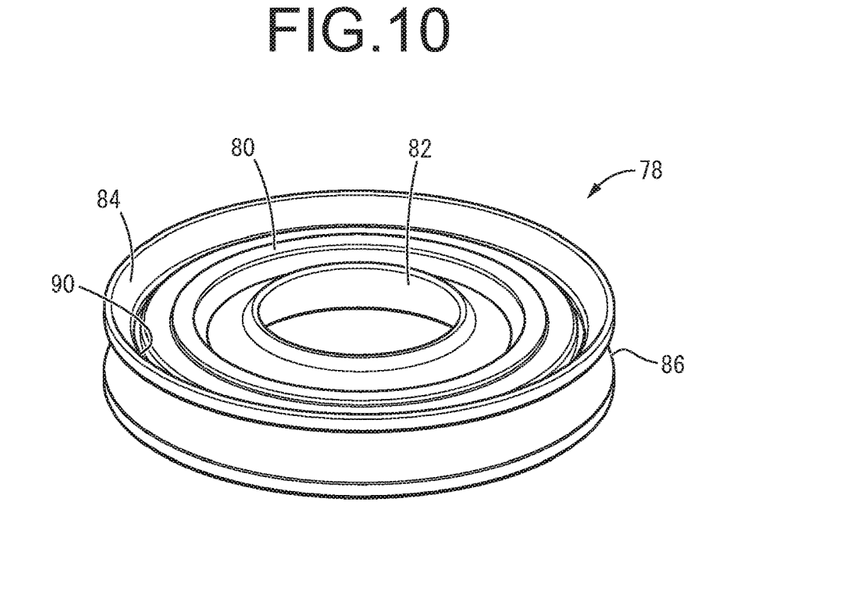
FIG. 10 is a perspective view of the elastic mover of the partitioner shown in FIG. 2.
Figure 11:
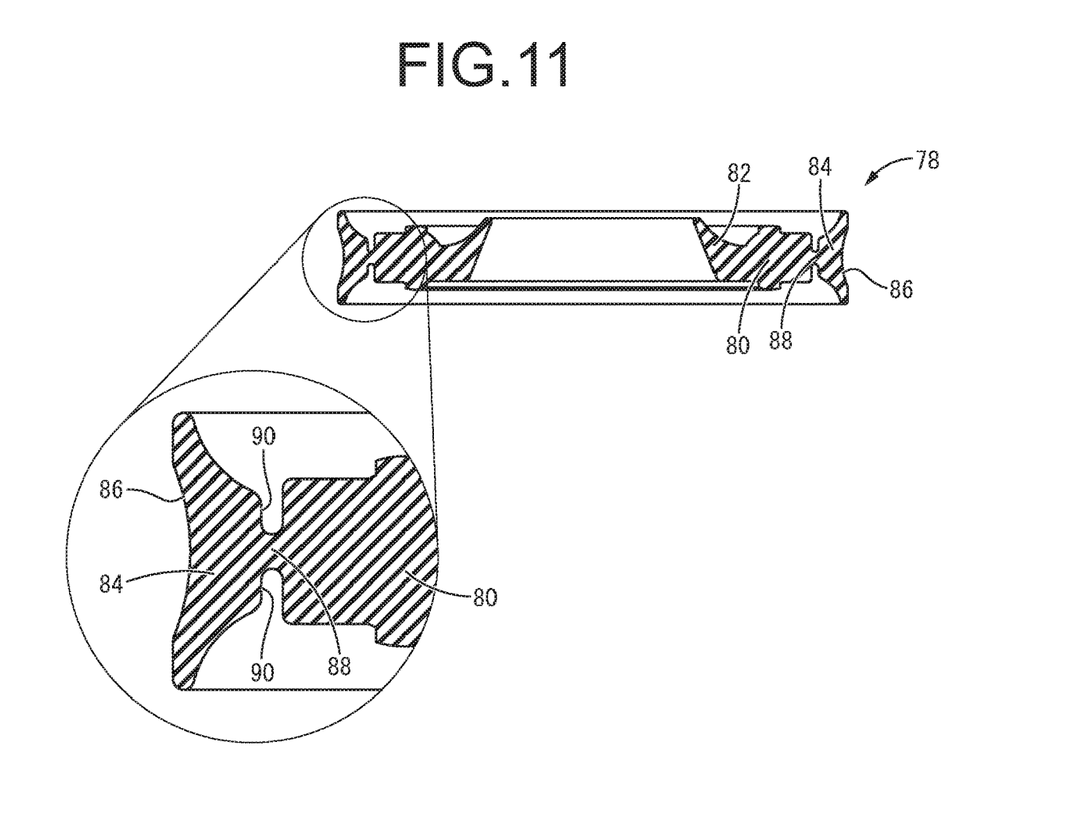
FIG. 11 is a longitudinal cross sectional view of the elastic mover shown in FIG. 10.

An elastic mover 78, which is a separate part, is disposed and combined in the storing space 76, in a housed state. The elastic mover 78 is formed from a rubber elastic body, or the like, in a substantially ring plate shape as a whole as FIGS. 10 and 11 show. More specifically, the elastic mover 78 includes a support 80 to be supported by the partitioner 38, and a relief valve 82 is integrally formed at the radial inside of the support 80, while a switch part 84 constituting a positioner 92 and a valve 94 described later is integrally formed at the radial outside of the support 80.

The support 80 extends in a ring form, with a roughly constant cross sectional shape. The support 80 is clamped in the up-down direction between the upper base face of the storing concavity 48 of the partitioner main unit 40 and the radially inner clamping part 70 of the bottom plate member 42, so that it is supported by the partitioner 38. In this practical embodiment, the both upper and lower faces of the radially inner part of the support 80 have a face curved in an arcuate shape in vertical cross section. Meanwhile, the upper base face of the storing concavity 48 and the upper face of the radially inner clamping part 70 of the bottom plate member 42 each have a curved face respectively corresponding to the upper and lower faces of the support 80. By so doing, the support 80 is easily positioned in radial directions relative to the partitioner 38.

The relief valve 82 has a slanting shape that slants upward as it goes to the radial inside, while it has a tapered cross sectional shape that becomes thinner as it goes to the radial inside. In this practical embodiment, the lower face of the relief valve 82 expands approximately in the axis-perpendicular direction at its radially outer part, while it has a tapered face slanting upward as it goes to the radial inside at its radially inner part. The relief valve 82 is integrally formed continuously at the radial inside of the support 80.

As shown in FIG. 11 in an enlarged state, the upper and lower faces of the switch part 84 each have a tapered face inclined axially outward as it goes to the radial outside, so that the outside dimension in the up-down direction gets larger as it goes to the radial outside. Moreover, with the upper and lower faces of the switch part 84, the inclination angle relative to the axis-perpendicular direction becomes larger as it goes to the radial outside, and the upper and lower faces of the switch part 84 are curved, gradually rising as it goes to the radial outside. The outer peripheral end of the switch part 84 has a semicircular-arc cross section that is convex to the outside in the up-down direction. The switch part 84 of the present practical embodiment has a generally symmetrical shape across the axis-perpendicular flat face that passes the up-down center.

Additionally, a concave portion 86 is formed in the outer peripheral face of the switch part 84. The concave portion 86 of this practical embodiment has a groove shape which is continuous along the entire circumference in the circumferential direction while opening to the outer peripheral face in the up-down center portion of the switch part 84. The concave portion 86 is continuous smoothly to the outer peripheral face of the switch part 84 in the up-down outside of the concave portion 86. Meanwhile, the inner face of the concave portion 86 is constituted by a face curved in nearly arcuate shape in vertical cross section. The curvature of the inner face of the concave portion 86 is set considering an abutment angle to the convex portion 58 by tilting of the valve 94 with swinging motion described later and the like, for example.

The switch part 84 is disposed radially outside the support 80 with a prescribed distance in between, and the switch part 84 and the support 80 are integrally linked by a thin part 88. The thin part 88 has a smaller up-down dimension than those of the support 80 and the switch part 84 and a film shape with flexibility. The thin part 88 connects the switch part 84 with the support 80 at its up-down center portion thereof. Besides, the switch part 84 is permitted to undergo displacement relative to the support 80, by deformation of the thin part 88. Almost linearly movement in the up-down direction of the switch part 84 relative to the support 80, tilting in vertical cross section of the switch part 84, and the like are enabled by the deformation of the thin part 88. The support 80 and the switch part 84 are separated radially and linked by the thin part 88 with a small up-down dimension. Consequently, annular grooves 90, 90 are formed radially between the support 80 and the switch part 84, while extending in an annular shape in the circumferential direction and opening respectively in the upper and lower faces of the elastic mover 78.

The elastic mover 78 having this structure is disposed in the storing space 76 formed between the partitioner main unit 40 and the bottom plate member 42. In the elastic mover 78, the support 80 at the middle in the radial directions is clamped between the upper base face of the storing concavity 48 in the partitioner main unit 40 and the radially inner clamping part 70 of the bottom plate member 42. Thus, the elastic mover 78 is attached to the partitioner 38.

The outer peripheral face of the switch part 84 of the elastic mover 78 is pressed against the outer peripheral wall face 54, in portions separate from the concave grooves 56 in the circumferential direction, in the outer peripheral wall face 54 of the storing space 76. This constitutes the positioners 92 disposed such that it is abutted against the outer peripheral wall face 54. In this way, the ouer peripheral faces of the positioners 92 are abutted against the outer peripheral face of the storing space 76, whereby the position of the outer peripheral face of the switch part 84 including the positioners 92 is positioned with good accuracy relative to the outer peripheral wall face 54. In a state where the elastic mover 78 is disposed in the storing concavity 48 of the partitioner main unit 40 and the positioners 92 are abutted on and positioned relative to the outer peripheral wall face 54 of the storing concavity 48, the bottom plate member 42 is attached to the partitioner main unit 40. By so doing, the support 80 is clamped between the partitioner main unit 40 and the bottom plate member 42, and the elastic mover 78 is thus kept in a prescribed position relative to the partitioner 38.

Furthermore, the switch part 84 of the elastic mover 78 is disposed separately from the outer peripheral wall face 54 radially inward, in formation portions of the concave grooves 56 in the outer peripheral wall face 54 of the storing space 76. The valves 94 are constituted to be separated from and disposed opposite to the outer peripheral wall face 54. This forms a gap passing through in the up-down direction between the outer peripheral faces of the valves 94 and the portions of the outer peripheral wall face 54 having the concave grooves 56. The width dimension of the gap is set by the distance between the outer peripheral faces of the valves 94 and the portions of the outer peripheral wall face 54 including the concave grooves 56 that are opposed. The width dimension is precisely set by abutment of the outer peripheral faces of the positioners 92 on the portions of the outer peripheral wall face 54 separate from the concave grooves 56 in the circumferential direction. In this practical embodiment, the convex portions 58 are formed in the outer peripheral wall face 54, while the concave portions 86 are provided in the outer peripheral faces of the valves 94, and the convex portions 58 and the concave portions 86 are disposed opposite to one another with a gap. Besides, the up-down dimension of the protruding tip of the convex portion 58 provided in the outer peripheral wall face 54 is made smaller than the up-down dimension of the opening of the concave portion 86 provided in the outer peripheral face of the valve 94. The protruding tip of the convex portion 58 is inserted in the concave portion 86. The valve 94 and the convex portion 58 are superposed to each other as viewed in the up-down direction. The upper and lower edges of the protruding tip of the convex portion 58 and the inner face of the concave portion 86 in the valve 94 are disposed to be closest to each other in a diagonal direction that is inclined relative to both the axial direction and the axis-perpendicular direction.

The positioner 92 and the valve 94 have almost the same shape mutually, and the switch part 84, which is constituted by the positioners 92 and the valves 94, is formed with an approximately constant cross sectional shape along the entire circumference. Since the positioners 92 and the valves 94 have the same shape and are provided continuously in the circumferential direction in this way, the elastic mover 78 of this practical embodiment is a rotational body around the center axis. Therefore, it is not required to position the elastic mover 78 in a prescribed diametrical direction, relative to the partitioner 38.

It is desirable that the valve 94 have a length that is not longer than one quarter of the circumference, continuously in the circumferential direction. It is more preferable that the valve 94 have a length that is not longer than one eighth of the circumference, continuously in the circumferential direction. Thus, in the present practical embodiment, the circumferential width dimension, the formation number, and the like of the concave grooves 56 formed in the outer peripheral wall face 54 of the storing space 76 are set such that the circumferential length of the valve 94 is in the aforesaid range. By setting the circumferential length of the valve 94 and the like as described above, the valve 94 is effectively positioned by abutment of the positioner 92 and the outer peripheral wall face 54, so that the width dimension of a communication passage 106 described later is set with high accuracy.

Also, the radially inner end of the relief valve 82 of the elastic mover 78 is pressed against the radially inner wall face 62 of the storing space 76. Thus, the abutted section of the relief valve 82 and the radially inner wall face 62 is sealed in a fluid-tight manner, and the radially inner part of the storing space 76 is partitioned by the relief valve 82 in the up-down direction.

As FIG. 1 shows, the partitioner 38 including the elastic mover 78 is disposed radially inside the second attachment member 14 and attached to the second attachment member 14 via the seal rubber layer 30. The partitioner 38 is fitted radially in the second attachment member 14 interposing the seal rubber layer 30 between them. This fitting is done for example by performing a diameter reduction process on the second attachment member 14, with the partitioner 38 inserted in the small-diameter tubular part 26 of the second attachment member 14. The partitioner 38 is mounted to the second attachment member 14, together with the flexible film 32.

The partitioner 38 is attached to the second attachment member 14 in this way, so that the partitioner 38 is disposed to divide the fluid filling section 36 into two in the up-down direction. Consequently, there is formed a pressure-receiving chamber 96 as a primary liquid chamber whose wall is partially constituted by the main rubber elastic body 16 at the upper side of the partitioner 38. Meanwhile, there is formed an equilibrium chamber 98 as an auxiliary liquid chamber whose wall is partially constituted by the flexible film 32 at the lower side of the partitioner 38.

The outer peripheral opening of the circumferential groove 44 formed at the outer peripheral end of the partitioner 38 is covered by the second attachment member 14 covered with the seal rubber layer 30. This forms a tunnel-shaped passage extending in the circumferential direction. One end of the tunnel-shaped passage communicates with the pressure-receiving chamber 96 via an upper communication aperture 100, while the other thereof communicates with the equilibrium chamber 98 via a lower communication aperture 102 (see FIG. 4). This forms an orifice passage 104 through which the pressure-receiving chamber 96 and the equilibrium chamber 98 communicate with each other. The tuning frequency of the orifice passage 104, which is the resonance frequency of the flowing fluid, is adjusted by the ratio between the passage cross sectional area and the passage length, and for example, it is tuned to a low frequency corresponding to engine shake.

The storing space 76 communicates with the pressure-receiving chamber 96 via the upper communication holes 50 and the upper relief holes 52 formed in the partitioner main unit 40, while it communicates with the equilibrium chamber 98 via the lower communication hole 72 and the connection holes 74 and the central hole 64 serving as the lower relief hole of the bottom plate member 42.

Figure 12A:
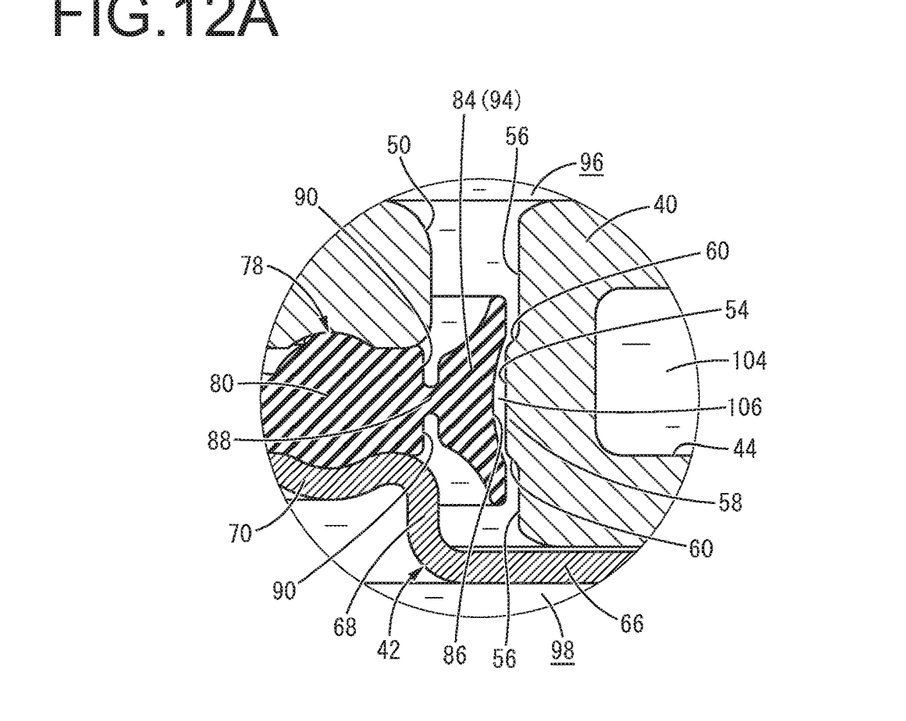

As FIG. 12A shows, there is formed the communication passage 106 connecting the pressure-receiving chamber 96 and the equilibrium chamber 98 with each other by the gap between the formation portion of the concave grooves 56 in the outer peripheral wall face 54 of the storing space 76 and the valves 94 of the switch part 84 that face each other in the radial directions. The communication passage 106 of the present practical embodiment is formed by providing the concave grooves 56 in the outer peripheral wall face 54 of the storing space 76, while separating the outer peripheral face of the switch part 84 from the outer peripheral wall face 54 by the concave grooves 56. The communication passage 106 is formed passing through in the up-down direction as a whole. Especially in this practical embodiment, the concave portions 86 are formed in the outer peripheral face of the switch part 84, in the up-down center part of the communication passage 106 where the convex portions 58 are provided in the outer peripheral wall face 54. Thus, although the positioner 92 and the valve 94 have the same shape mutually in the switch part 84, the communication passage 106 is formed extending between the convex portions 58 and the concave portions 86. The tuning frequency of the communication passage 106, which is the resonance frequency of the flowing fluid, is tuned to a higher frequency than that of the orifice passage 104, and for example, it is tuned to a midrange- to high-frequency corresponding to idling vibration, driving rumble, and the like.

Here, in the switch part 84, the positioners 92 are abutted on the outer peripheral wall face 54 of the storing space 76, at portions separate from the concave grooves 56 in the circumferential direction. As a result, the relative radial positioning of the valves 94 and the outer peripheral wall face 54 of the storing space 76 where the concave grooves 56 are formed is set with good accuracy. This makes it possible to stably form the gap between the valves 94 and the outer peripheral wall face 54, with a narrower width in the radial directions. Therefore, the communication passage 106 whose width is narrow can be formed stably.

Particularly, the thin part 88 is provided between the support 80 and the switch part 84 (the positioners 92 and the valves 94) in the elastic mover 78 in the radial directions. By so doing, radial displacement or deformation of the switch part 84 by the abutment between the positioners 92 and the outer peripheral wall face 54 of the storing space 76 is permitted by the thin part 88 being deformed such that the widths of the annular grooves 90, 90 change. Therefore, when the elastic mover 78 is disposed in the storing concavity 48 of the partitioner main unit 40, the relative radial positions of the valve 94 and the outer peripheral wall face 54 are set precisely, whereby the narrow communication passage 106 is stably formed.

Additionally, in this practical embodiment, the convex portion 58 provided in the outer peripheral wall face 54 is inserted in the concave portion 86 of the valve 94. The valve 94 is disposed to be closest to the tip corner at each axial side of the convex portion 58, and the communication passage 106 is narrowed at the portion of the closest approach, so that the substantial width dimension of the communication passage 106 is made small.

Furthermore, the thin part 88 is provided radially between the support 80 supported by the partitioner 38 and the positioner 92 and the valve 94, whereby the abutting force of the positioner 92 relative to the outer peripheral wall face 54 of the storing space 76 is adjusted by deformation of the thin part 88. Consequently, the radial positioning action of the switch part 84 owing to the abutment of the positioner 92 on the outer peripheral wall face 54 of the storing space 76 is effectively provided, while up-down sliding of the switch part 84 in relation to the outer peripheral wall face 54 is allowed.

With respect to the elastic mover 78 disposed in the storing space 76, liquid pressure of the pressure-receiving chamber 96 is exerted on the upper face of the switch part 84 via the upper communication hole 50. Meanwhile, liquid pressure of the equilibrium chamber 98 is exerted on the lower face of the switch part 84 via the lower communication hole 72 and the connection holes 74. On the other hand, the liquid pressure of the pressure-receiving chamber 96 is exerted on the upper face of the relief valve 82 via the upper relief hole 52, while the liquid pressure of the equilibrium chamber 98 is exerted on the lower face of the relief valve 82 via the central hole 64.

The engine mount 10 having this structure according to the present practical embodiment connects the power unit and the vehicle body in a vibration-damping manner. This connection is made for example by mounting the first attachment member 12 to the not-shown power unit using the screw hole 20 and mounting the second attachment member 14 to the not-shown vehicle body.

In this state of the engine mount 10 being mounted to the vehicle, a low-frequency, large-amplitude vibration corresponding to engine shake is input in the up-down direction between the first attachment member 12 and the second attachment member 14. This input makes the main rubber elastic body 16 undergo elastic deformation, thereby inducing internal pressure fluctuation of the pressure-receiving chamber 96. Then, the fluid flows through the orifice passage 104 on the basis of relative pressure difference between the pressure-receiving chamber 96 and the equilibrium chamber 98. Consequently, based on the flowing action including the resonance action of the flowing fluid, the target vibration-damping effect such as high attenuating or damping action is exhibited.

Figure 12B:
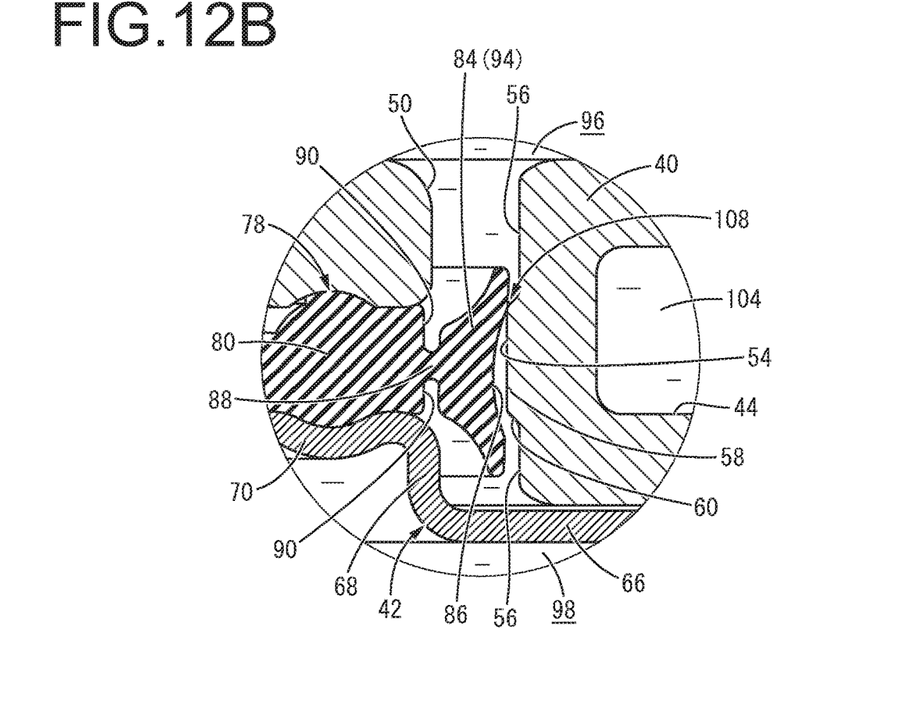

Upon input of such a large-amplitude vibration, on the basis of relative liquid pressure difference between the pressure-receiving chamber 96 and the equilibrium chamber 98, the switch part 84 is displaced by deformation of the thin part 88. As FIG. 12B shows, the valve 94 of the switch part 84 is pressed against the outer peripheral wall face 54 of the storing space 76, whereby the communication passage 106 is blocked up by the valve 94. As a result, the fluid is prevented from flowing via the communication passage 106 between the pressure-receiving chamber 96 and the equilibrium chamber 98, thereby efficiently inducing the fluid flow through the orifice passage 104. In this way, a switch means 108 that switches the communication passage 106 to the blocked state is constituted by the valve 94 being pressed against the outer peripheral wall face 54 of the storing space 76.

In this practical embodiment, the valve 94 is displaced in the up-down direction, and it tilts with swinging motion to be inclined in vertical cross section. By so doing, the inner face of the concave portion 86 of the valve 94 is abutted against the convex portion 58 provided in the outer peripheral wall face 54 of the storing space 76. The valve 94 can be abutted on the outer peripheral wall face 54 of the storing space 76 also by elastic deformation of the both upper and lower ends of the valve 94, which are thin. The upper and lower side faces 60, 60 of the convex portion 58 are slanting faces. Owing to this, in this case where the valve 94 undergoes not only the up-down displacement but also displacement or deformation such that the valve 94 is inclined in vertical cross section, a large receiving face of the convex portion 58 in relation to tilting of the valve 94 is provided easily. Thus, also in a case of different displacement or deformation mode of the valve 94, stable abutment of the valve 94 and the convex portion 58 is realized.

In addition, the up-down width dimension of the protruding tip of the convex portion 58 is made smaller than the up-down width dimension of the opening of the concave portion 86. By so doing, when the valve 94 tilts while being displaced in the up-down direction, the inner face of the concave portion 86 is easily abutted on the convex portion 58. Thus, obstruction of the communication passage 106 by the abutment of the valve 94 and the convex portion 58 is stably realized. Additionally, the upper and lower side faces 60, 60 of the convex portion 58 are slanting faces, so that the upper and lower edges of the protruding tip of the convex portion 58 are obtuse angles in vertical cross section. Therefore, stable seal performance can be gotten irrespective of various contact angles of the valve 94, thereby enabling more stable blocking of the communication passage 106 by the valve 94.

The up-down dimension of the valve 94 of this practical embodiment grows gradually larger as it goes to the outer periphery, and the upper and lower ends of the outer peripheral part of the valve 94 are thin in the radial directions. Therefore, when the upper and lower ends of the outer peripheral face of the valve 94 are abutted on the outer peripheral wall face 54 of the storing space 76, striking noise hardly occurs.

Meanwhile, when a midrange- to high-frequency, small-amplitude vibration, which corresponds to idling vibration, driving rumble, and the like, is input between the first attachment member 12 and the second attachment member 14, displacement amount of the switch part 84 is small, and the valve 94 is kept in a state of being separated from the outer peripheral wall face 54 of the storing space 76. Thus, as FIG. 12A shows, the communication passage 106 formed between the valve 94 and the outer peripheral wall face 54 is in a communication state. Consequently, the fluid flows through the communication passage 106 between the pressure-receiving chamber 96 and the equilibrium chamber 98, so that the vibration-damping effect including lower dynamic spring on the basis of the fluid flowing action is exhibited.

In the present practical embodiment, the width dimension of the communication passage 106 is made smaller than that of the conventional structure, whereby the communication passage 106 is configured to be blocked up by the valve 94 being abutted against the outer peripheral wall face 54 of the storing space 76 by small displacement of the valve 94. This makes it possible in the engine mount 10 to switch the communication passage 106 between the communication state and the blocked state by a smaller amplitude range.

Figure 13:
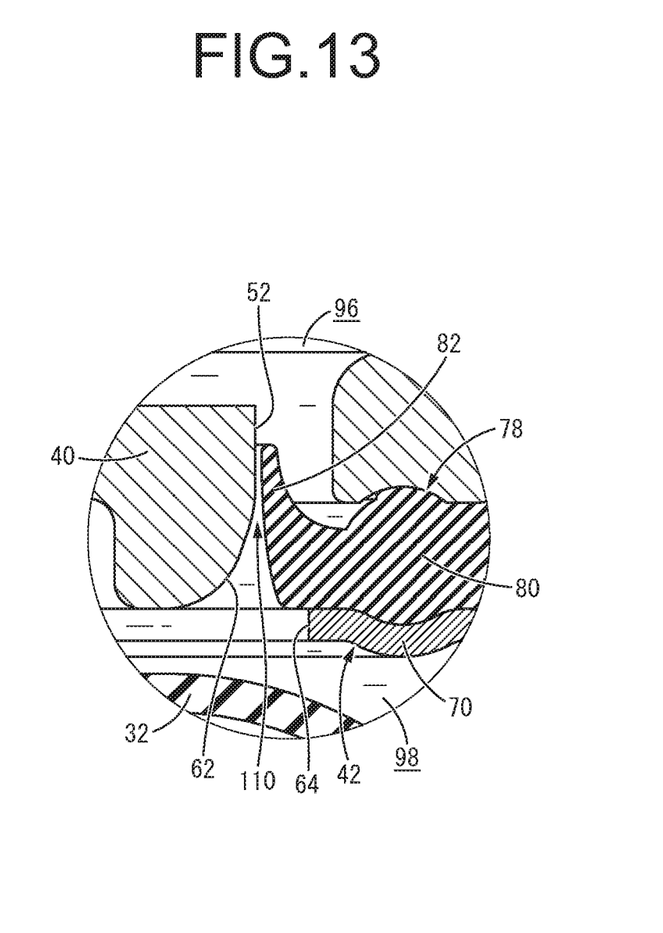
FIG. 13 is an enlarged longitudinal cross sectional view of another principal part of the engine mount shown in FIG. 1, showing a communication state of a short-circuit passage.

If the internal pressure of the pressure-receiving chamber 96 decreases greatly to a level allowing gas phase separation due to cavitation, the relief valve 82 is displaced upward based on large pressure difference between the pressure-receiving chamber 96 and the equilibrium chamber 98. Thus, as FIG. 13 shows, the relief valve 82 is separated from the radially inner wall face 62 of the storing space 76. This forms the short-circuit passage 110 connecting the pressure-receiving chamber 96 and the equilibrium chamber 98 with one another through the gap between the relief valve 82 and the radially inner wall face 62. The fluid flows from the equilibrium chamber 98 to the pressure-receiving chamber 96 via the short-circuit passage 110, thereby rapidly preferred moderating or eliminating internal pressure decline of the pressure-receiving chamber 96, so that noise due to cavitation is avoided. On the other hand, if the internal pressure of the pressure-receiving chamber 96 increases greatly, the relief valve 82 is pressed against the radially inner wall face 62 by positive pressure of the pressure-receiving chamber 96. Therefore, the short-circuit passage 110 is not formed, and the fluid efficiently flows via the orifice passage 104 on the basis of the internal pressure fluctuation of the pressure-receiving chamber 96.

The practical embodiment of the present invention has been described above, but this invention is not limited by the specific description of the practical embodiment. For example, in the aforesaid practical embodiment, the positioner 92 and the valve 94 are provided radially outside the support 80 so that the passage cross sectional area of the communication passage 106 is largely kept. Alternatively, it is possible to provide the positioner and the valve radially inside the support. Moreover, it is also possible to provide the positioner and the valve both radially outside and inside the support.

It is desirable that the valve blocks out the fluid flow through the communication passage 106 at both sides in the passage length direction, like the above-described practical embodiment. However, it is also possible that the fluid flow through the communication passage 106 is blocked out only at one side in the flow direction, for example. Specifically, for example, by using a valve formed to be equivalent to the upper half part of the valve 94 of the aforementioned practical embodiment, the communication passage 106 can be configured to be in the blocked state when positive pressure acts on the pressure-receiving chamber 96 and be in the communication state when negative pressure acts on the pressure-receiving chamber 96.

In the above-said practical embodiment, the positioner 92 and the valve 94 have the same shape mutually and they are provided continuously in the circumferential direction, but the positioner and the valve may have mutually different shapes. For example, it is possible to employ a positioner having such a shape that the deformation amount by abutment reaction force is small, in order to provide stable positioning action by abutment on the peripheral wall face of the storing space.

In the aforementioned practical embodiment, the thin part 88 is significantly thinner than the support 80 and the switch part 84, and steps are formed at the connection sections of the thin part 88 relative to the support 80 and the switch part 84. However, for example, the thin part 88 may be provided radially inside the switch part 84 to be continuously thinned, and it is not always necessary to form the annular grooves 90, 90 at both axial sides of the thin part 88.

The concave groove opening in the peripheral wall face of the storing space may be formed to be continuous along the whole axial length in the peripheral wall face of the storing space, and the convex portion is dispensable. Besides, if the communication passage is formed by differentiating the shapes of the positioner and the valve from each other, it is possible that the concave groove is not provided in the peripheral wall face of the storing space.

What is claimed is:

1. A fluid-filled vibration-damping device comprising:
   a first attachment member;
   a second attachment member;
   a main rubber elastic body elastically connecting the first attachment member and the second attachment member with each other;
   a primary liquid chamber filled with a non-compressible fluid;
   an auxiliary liquid chamber filled with the non-compressible fluid;
   a partitioner dividing the primary liquid chamber and the auxiliary liquid chamber formed at opposite sides of the partitioner, the partitioner having a storing space;
   an elastic mover disposed in the storing space and having a support, the support being supported by the partitioner;
   a positioner provided on at least one of a radial inside and a radial outside of the support, the positioner being provided partially in a peripheral direction of the support, and the positioner is disposed such that the positioner is abutted against a peripheral wall face of the storing space;
   a valve provided at a portion separate from the positioner in the peripheral direction, the valve being disposed opposite to the peripheral wall face of the storing space and separated from the peripheral wall face;
   a thin part having a thin wall in an axial direction, the thin part connecting the positioner and the valve relative to the support in a displaceable manner;
   a communication passage formed between the peripheral wall face of the storing space and the valve, the communication passage connecting the primary liquid chamber and the auxiliary liquid chamber with each other;
   a switch configured to block up the communication passage by an abutment of the valve against the peripheral wall face of the storing space; and
   at least one concave groove opening in the peripheral wall face of the storing space and formed partially in the peripheral direction, the communication passage being formed at a formation portion of the at least one concave groove in the peripheral direction.

2. The fluid-filled vibration-damping device according to claim 1, wherein:
   the at least one concave groove includes two concave grooves formed at opposite axial ends in the peripheral wall face of the storing space so that a convex portion is provided between the two concave grooves formed at the opposite axial ends,
   a concave portion is formed in the valve of the elastic mover, and in a face of the valve opposite to the peripheral wall face, and
   the convex portion of the peripheral wall face is disposed opposite to the concave portion of the valve with a distance in between so that the communication passage extends between the convex portion and the concave portion.

3. The fluid-filled vibration-damping device according to claim 2, wherein the convex portion of the peripheral wall face is inserted in the concave portion of the valve.

4. The fluid-filled vibration-damping device according to claim 2, wherein each axial side face of the convex portion is a slanting face such that the convex portion has a tapered shape with a width that decreases in the axial direction as the convex portion extends toward a protruding tip of the convex portion.

5. The fluid-filled vibration-damping device according to claim 1, wherein the positioner and the valve in the elastic mover have a same shape mutually.

6. The fluid-filled vibration-damping device according to claim 1, wherein an outside dimension in the axial direction of the valve increases as the valve extends toward the peripheral wall face of the storing space.

* * * * *